No. 785,742. PATENTED MAR. 28, 1905.
L. P. LIPPS.
GRADUATED MEASURE.
APPLICATION FILED JUNE 8, 1904.

WITNESSES:
John P. Dowd
Arthur C. Pine

INVENTOR
Louis Philip Lipps.

No. 785,742. Patented March 28, 1905.

UNITED STATES PATENT OFFICE.

LOUIS PHILIP LIPPS, OF CLEVELAND, OHIO.

GRADUATED MEASURE.

SPECIFICATION forming part of Letters Patent No. 785,742, dated March 28, 1905.

Application filed June 8, 1904. Serial No. 211,618.

*To all whom it may concern:*

Be it known that I, LOUIS PHILIP LIPPS, a citizen of the United States, residing at Cleveland, in the county of Cuyahoga and State of Ohio, have invented a new and useful Graduated Measure, more particularly adapted to the measuring of ice-cream for the retail trade, of which the following is a specification.

My invention relates to improvements in measures in which a plunger is used to extract the contents from a measure into a receptacle; and the objects of my improvements are, first, to provide a measure that will extract a desired quantity of ice-cream from a freezer; second, to afford facilities for extracting the contents from the measure. I attain these objects by the mechanism illustrated in the accompanying drawings, in which—

Figure 2:
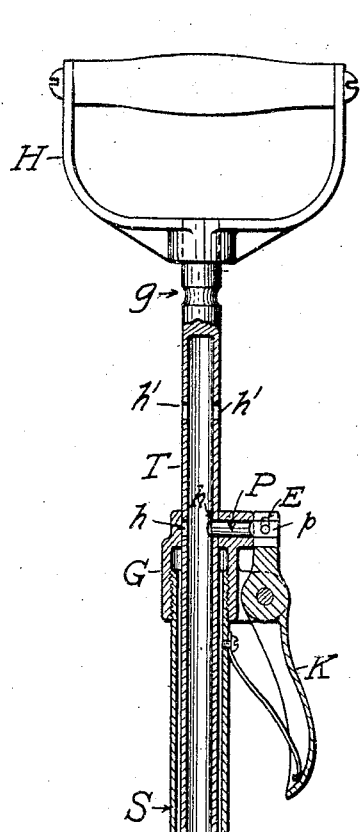
Figure 1:
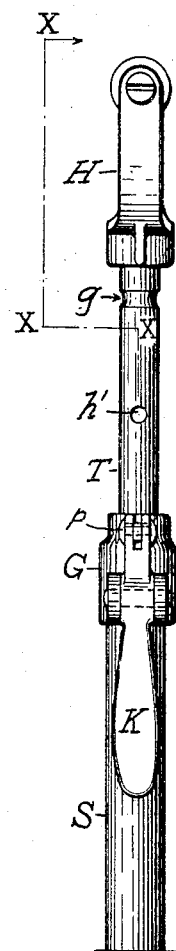
Figure 3:
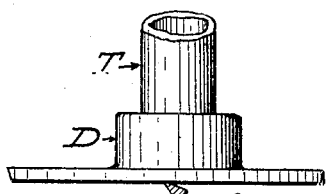
Figure 4:
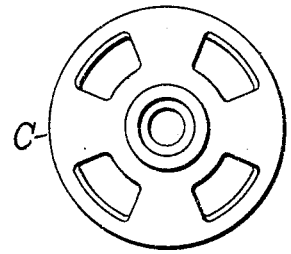
Figure 5:
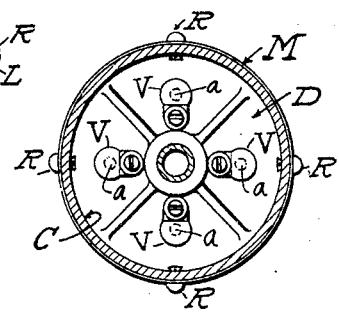

Figure 1 is an elevation of the measure. Fig. 2 is a vertical section taken on the lines $x\,x\,x\,x$ of Fig. 1. Fig. 3 is an enlarged section of the cut-off bar or blade, shown in contact with the plunger. Fig. 4 is a top view of the frame or stand C; and Fig. 5 is a horizontal section, taken on the line Y Y of Fig. 2, showing the plunger and its air-valves.

Similar letters refer to similar parts throughout the several views.

The cylinder M, with its cut-off bar or blade O, together with the central stand C, the stem S, the guide G, and the pin P, connected to the clip K by the pin $p$, constitute the measure proper. The small pin $p$, while tight in pin P, moves in the oblong hole E in clip K. Throughout the stem S passes a plunger-rod T, carrying at its upper end the handle H and at its opposite or lower end the plunger D, referred to hereinafter. Passing the plunger-rod T through holes in the guide G and the stand C of a lesser diameter than the inside diameter of the stem S reduces the friction on the plunger-rod T to a minimum.

The plunger D, previously referred to, is fastened to the lower end of the plunger-rod T. It has several air-vents $a\,a\,a\,a$, which allow the air to pass through said vents while the measure is being filled. Said vents are closed by the valves V V V V, which may be made of any suitable material, fastened to the plunger D. It is evident that when the measure is being forced into any substance—in the present instance ice-cream—the downward pressure causes the air to press against the valves V V V V, opening the same, and thereby escaping, and, conversely, the upward motion in extracting the ice-cream from the freezer causes the valves V V V V to close, creating a suction in the cylinder M, thereby helping to hold the ice-cream in the measure. The force is applied to the measure proper by the plunger-rod T engaging the pin P in the guide G, the guide G being rigidly fastened to the stem S, which is likewise fastened to the stand C.

The cylinder M has preferably a saw-tooth edge at its lower end, aiding it to cut its way into the ice-cream. At its upper end are several L-shaped slots L L L L, by which the cylinder M is easily removed from the stand C by backing the screws R R R R and giving the cylinder M a slight turn and downward pull.

To operate the measure, the plunger D must be up to the desired height. Plunger D is held at this desired height by the pin P passing through a hole $h$ or $h'$, as the case may require, in the plunger-rod T. After having the measure set for the desired quantity it is forced into the substance to the depth desired. Then by turning the measure—a half-turn sufficing—the ice-cream in the measure is cut off from the ice-cream in the freezer by the cut-off bar or blade O. Having thus filled the measure, it is withdrawn from the freezer and its contents is extracted into a receptacle by grasping the stem S at its upper end, and by forcing the clip K toward the stem S the pin P is drawn from the hole $h$ or $h'$ in the plunger-rod T, releasing the plunger-rod T from the guide G, thereby enabling the free downward motion of the plunger-rod T and plunger D, forcing the contents from the cylinder M. The plunger D is held in its lowest position by the pin P engaging itself in the groove $g$. While in this position the handle H, the plunger-rod T, and the plunger D are free to turn. As the groove $g$ is arranged in the plunger-rod T so that the plunger D will come in contact with the cut-off bar or blade o, it will be readily seen that by turning the handle H the ice-cream will be cleaned off the plunger D.

I provide the means of graduating the measure by having the holes h h' located in the plunger-rod T, so that the desired quantity can be had by the holes h or h' engaging the pin P. When the plunger D is at the position indicated by the dotted lines in Fig. 2, the hole h' will have engaged the pin P, which gives only half the quantity in the measure as that given when the hole h engages the pin P. While I have only shown two such holes, any number of holes may be added to get the different quantities desired.

I am aware that prior to my invention graduated measures have been made with a rod or tube with notches or holes engaging a clip to give the desired quantities. I therefore do not claim such a combination broadly. I am also aware that the cut-off bar or blade o can be fastened to a rod and made to pass within the plunger-rod T and be made to do the work intended for it by extra mechanism and extra operations.

What I do claim as my invention, and desire to secure by Letters Patent, is—

1. In a graduated measuring scoop or ladle, the combination of a hollow stem, a cylinder detachably connected thereto, a plunger within said cylinder having a plunger-rod extending upwardly through said stem, a cut-off bar or blade transversely of the mouth of said cylinder and fastened to the same, suitable means for setting said plunger-rod at predetermined points with respect to said stem and suitable means for locking the same against longitudinal and rotary movement in said stem, all substantially as shown and described.

2. In a graduated measuring scoop or ladle, the combination of a hollow stem, a cylinder detachably connected thereto, a plunger within said cylinder having a plunger-rod extending upwardly through said stem, a cut-off bar or blade transversely of the mouth of said cylinder and fastened to the same, suitable means for setting said plunger-rod at predetermined points with respect to said stem and suitable means for locking the same against longitudinal and rotary movement in said stem, together with one or more upwardly-opening valves in the top of said plunger; all substantially as shown and described.

3. In a graduated measuring scoop or ladle, the combination of a hollow stem, a cylinder detachably connected thereto, a plunger within said cylinder having a plunger-rod extending upwardly through said stem, a cut-off bar or blade transversely of the mouth of said cylinder and fastened to the same, suitable means for setting said plunger-rod at predetermined points with respect to said stem and suitable means for locking the same against longitudinal and rotary movement in said stem, together with suitable means for detachably connecting said cylinder to said stem, all substantially as shown and described.

4. In a graduated measuring scoop or ladle, the combination of a hollow stem, a cylinder detachably connected thereto, a plunger within said cylinder having a plunger-rod extending upwardly through said stem, a cut-off bar or blade transversely of the mouth of said cylinder, and fastened to the same, and suitable means for locking said plunger-rod against longitudinal movement in said stem when its plunger is in bearing against said cut-off bar or blade, substantially as shown and described.

In testimony whereof I have signed my name to this specification in the presence of two subscribing witnesses.

LOUIS PHILIP LIPPS.

Witnesses:
VICTOR E. MUELLER,
C. E. ROSEMAN.